(12) United States Patent
Hajduczenia

(10) Patent No.: US 10,853,559 B2
(45) Date of Patent: Dec. 1, 2020

(54) SYMMETRIC TEXT REPLACEMENT

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 43 days.

(21) Appl. No.: 16/366,049

(22) Filed: Mar. 27, 2019

(65) Prior Publication Data

US 2020/0311189 A1 Oct. 1, 2020

(51) Int. Cl.
*G06F 3/0488* (2013.01)
*G06F 40/166* (2020.01)
*G06F 3/0481* (2013.01)

(52) U.S. Cl.
CPC .......... *G06F 40/166* (2020.01); *G06F 3/0481* (2013.01)

(58) Field of Classification Search
CPC ............................ G06F 40/166; G06F 3/0481
USPC ........................................................ 715/271
See application file for complete search history.

(56) References Cited

U.S. PATENT DOCUMENTS

| | | | | |
|---|---|---|---|---|
| 5,748,966 A * | 5/1998 | Sato | ........................ | G06F 8/437 717/116 |
| 7,996,769 B2 * | 8/2011 | Fux | ...................... | G06F 40/232 715/257 |
| 2002/0103834 A1 | 8/2002 | Thompson et al. | | |
| 2009/0217159 A1 * | 8/2009 | Dexter | ................ | G06F 16/8373 715/271 |
| 2011/0107060 A1 | 5/2011 | McAllister et al. | | |
| 2011/0258103 A1 * | 10/2011 | Oaten | .................... | G06Q 40/00 705/37 |
| 2015/0379156 A1 * | 12/2015 | Sun | ........................ | G06F 16/972 715/234 |
| 2017/0039267 A1 * | 2/2017 | Shmiel | ................ | G06F 16/9024 |

OTHER PUBLICATIONS

Marijin Heverbeke, Eloquent javaScript, 2018, MIT, 325 financial backers, Third Edition, 154, 391, 407. (Year: 2018).*

Gookin, "How to Write Word 2016 Macros to Swap Text Elements", Word 2016 for Professionals for dummies, (2006) 17 pages.

(Continued)

*Primary Examiner* — Scott T Baderman
*Assistant Examiner* — Hassan Mrabi
(74) *Attorney, Agent, or Firm* — The Marbury Law Group, PLLC

(57) ABSTRACT

Systems, methods, and devices of various embodiments may receive first and second text strings for performing a symmetric text replacement. An original recitation of the first or second text strings may be located, wherein at least one intervening other text string is disposed between the first and second text strings. Each original recitation of the first text string may be replaced with a substituted recitation of the second text string in response to determining the located original recitation of the first and second text strings matches the first text string. Similarly, each original recitation of the second text string may be replaced with a substituted recitation of the first text string in response to determining the located original recitation of the first and second text strings matches the second text string.

27 Claims, 9 Drawing Sheets

(56) References Cited

OTHER PUBLICATIONS

"Swapping characters, words and lines", Tip 47 Printable Monobook, (2001), 2 pages.
Wyatt, "Transposing Two Words", https://www.tips.net/Authors/A0001_Allen_Wyatt.html, (Jun. 25, 2018), 3 pages.
"Finding and replacing text in a project", PyCharm Edu (Dec. 24, 2018), 4 pages.
"Modify text strings using Say What? plugin", (https://easydigitaldownloads.com?utm_campaign=documentation&utm_source=helpscout&utm_medium=doc&utm_term=2011-modify-text-strings-using-say-what-plugin), (2019), 5 pages.
Waldner, "Text replacement in context/out of context", Proudly uncool and out of fashion, \1, (Aug. 4, 2012), 4 pages.

* cited by examiner

SYMMETRIC TEXT REPLACEMENT

BACKGROUND

Contemporary text editors often provide text replacement functionality. For example, a feature commonly referred to as the "Replace" feature in many word processor applications finds a search text string and replaces the searched text string with another designated text string. The Replace feature sometimes includes options allowing a user to replace only select recitations of the search text string, such as the first recitation, all recitations, or recitations individually selected by user input/approval. More advanced text editors allow text formatting details to be included in the search and/or replace criteria (e.g., 'Match Case').

Some computer macros enable a word processor application to transpose two adjacent words by placing the cursor between any recitation of the two words in a document and running a customized macro. For example, by placing the cursor between the word "boldly" and the word "go," and running the macro, the expression "boldly go" may be replaced by the expression "go boldly." Although such a macro may save a user time, since it is quicker than typing out the search string "boldly go" and the replacement string "go boldly," it is limited to adjacent words.

SUMMARY

The systems, methods, and devices of the various embodiments disclosed herein may enable methods of editing a text document. The method may receive, first and second text strings for performing a symmetric text replacement in a text file. At least one original recitation of either of the first and second text strings may be located, wherein at least one intervening other text string is disposed between the first and second text strings. A determination may be made as to whether the located at least one original recitation of the first and second text strings matches the first text string or the second text string. Each original recitation of the first text string may be replaced with a substituted recitation of the second text string in response to determining the located original recitation of the first and second text strings matches the first text string. Similarly, each original recitation of the second text string may be replaced with a substituted recitation of the first text string in response to determining the located original recitation of the first and second text strings matches the second text string.

In some embodiments, a first contextual parameter associated with the first text string may be received from the user. Replacing each original recitation of the first text string with the substituted recitation of the second text string may be further in response to determining the located original recitation of the first and second text strings matches the first contextual parameter. A second contextual parameter associated with the second text string may also be received from the user. Replacing each original recitation of the second text string with the substituted recitation of the first text string may be further in response to determining the located original recitation of the first and second text strings matches the second contextual parameter. A third text string and an alternative first contextual parameter associated with the first text string may further be received for performing an alternate symmetric text replacement of the first text string with the third text string in the text file. A determination may be made as to whether the located at least one original recitation of the first and second text strings matches the first text string and the alternative first contextual parameter. Each original recitation of the first text string may be replaced with a substituted recitation of the third text string in response to determining the located original recitation of the first and second text strings matches the first text string and the alternative first contextual parameter. In addition, at least one original recitation of the third text string may be located and each original recitation of the third text string replaced with a substituted recitation of the first text string.

In some embodiments, the first and second text strings may be received as a single combined text string containing both the first and second text strings separated by a punctuation mark. The first and second text strings may be received as a single combined text string containing both the first and second text strings separated by at least one predetermined separation text character. Also, a general contextual parameter associated with either the first and second text strings may also be received. Replacing each original recitation of the first and second text strings may be further in response to determining the located original recitations of the first and second text strings match the general contextual parameter. The at least one intervening other text string may not be a conjunction term or expression.

In various embodiments, a method of editing a text document may receive first, second, and third text strings for performing an alternative text replacement in a text file. Additionally, alternative first and second contextual parameters associated with alternative replacements of the first text string in the text file may be received. At least one original recitation of the first text string may be located. A determination may be made as to whether the located at least one original recitation of the first text string matches the first contextual parameter or the second contextual parameter. Each original recitation of the first text string may be replaced with a substituted recitation of the second text string in response to determining the located original recitation of the first text string matches the first contextual parameter. Similarly, each original recitation of the first text string may be replaced with a substituted recitation of the third text string in response to determining the located original recitation of the first text string matches the second contextual parameter.

In some embodiments, at least one original recitation of the second text string may be located. Each located original recitation of the second text string may be replaced with a substituted recitation of the first text string. Also, at least one original recitation of the third text string may be located. Each located original recitation of the third text string may be replaced with a substituted recitation of the first text string.

Further embodiments disclosed herein include a processor configured with processor-executable instructions to perform operations of the methods summarized above. Further embodiments disclosed herein include a device including means for performing functions of the methods summarized above. Further embodiments disclosed herein include a non-transitory processor-readable storage medium having stored thereon processor-executable instructions configured to cause a processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
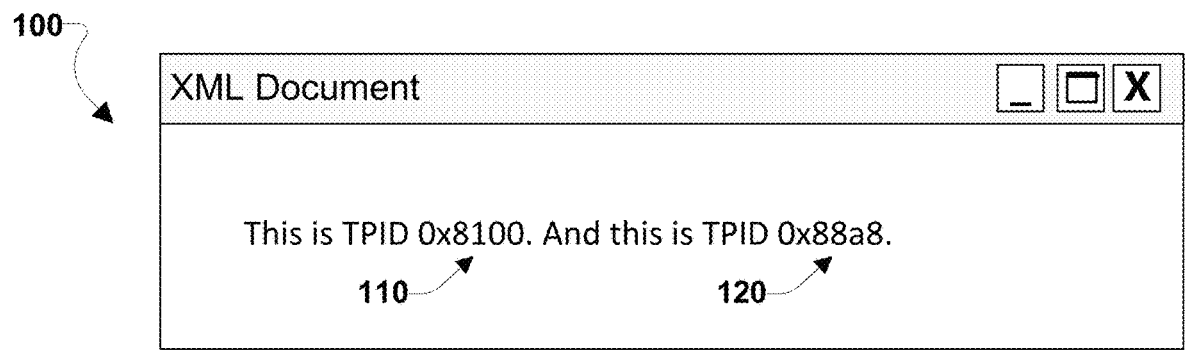
FIG. 1A is a graphic user interface illustrating a text editor showing a portion of an XML document needing editing, in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" is used to refer to any one or all of satellite or cable set top boxes, laptop computers, rack mounted computers, routers, cable modem termination systems (CMTSs), switches (such as time-division multiplexing switches, etc.), telephones (such as wired telephones, cellular telephones, multimedia Internet enabled cellular telephones, smart phones, etc.), personal or mobile multi-media players, personal data assistants (PDAs), personal computers, tablet computers, smart books, palm-top computers, desk-top computers, wireless electronic mail receivers, wired or wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The systems, methods, and devices of the various embodiments disclosed herein may enable a text-string exchange in which each recitation of a first and second text string may be converted to the other of the first and second text string. In this way, each recitation of a first text string (e.g., <source-string>) may be automatically replaced by a second text string (e.g., <target-string>) and each recitation of the second text string may also be automatically replaced by the first text string. This form of reciprocal text swap is herein referred to as a "symmetric text replacement."

Providing a text editor that enables an automatic symmetric text swap where all recitations of a first text string may be replaced with a second text string and all recitations of the second text string may be replaced with the first text string may be desired when coding and replacing blocks of text, swapping variable names, or any other operations where two text strings need to be swapped. The symmetric text replacement features of various embodiments may speed-up and provide more accuracy when performing text editing, as compared to manually performing such text string swaps or using contemporary techniques.

In various embodiments, the symmetric text replacement may filter the automatic text string replacement of various embodiments using one or more contextual parameters. A first contextual parameter associated with the first text string may be provided and used when replacing each original recitation of the first text string with the substituted recitation of the second text string. In such embodiments, the replacement of the first text string with the second text string may further be in response to determining that the located original recitation of the first text string matches the first contextual parameter. Similarly, a second contextual parameter associated with the second text string may be provided and used when replacing each original recitation of the second text string with the substituted recitation of the first text string. In such embodiments the replacement of the second text string with the first text string may further be in response to determining the located original recitation of the second text string matches the second contextual parameter. Further, the first and/or second contextual parameter may be a general contextual parameter associated with either the first and second text string. In such embodiments, replacing each original recitation of the first and second text strings may be in response to determining the located original recitations of the first and second text strings match the general contextual parameter.

In various embodiments, the symmetric text replacement may use a third text string and an alternative first contextual parameter associated with the first text string for performing an alternate symmetric text replacement of the first text string with the third text string in the text file. In such an embodiment, the first text string may be replaced with the third text string in response to determining the located original recitation of the first text string matches the alternative first contextual parameter. Optionally, each original recitation of the third text string may be replaced with a substituted recitation of the first text string.

Figure 1B:
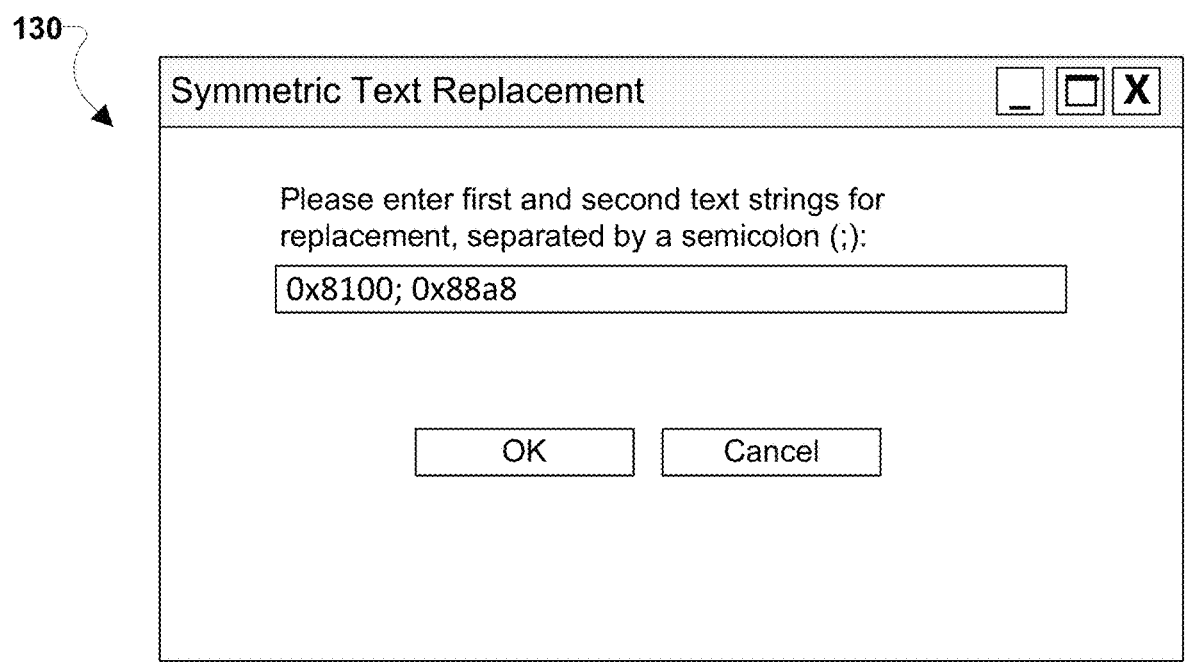
FIG. 1B is a graphic user interface illustrating a pop-up window with a user prompt containing text strings for a symmetric text replacement feature, in accordance with various embodiments.
Figure 1C:
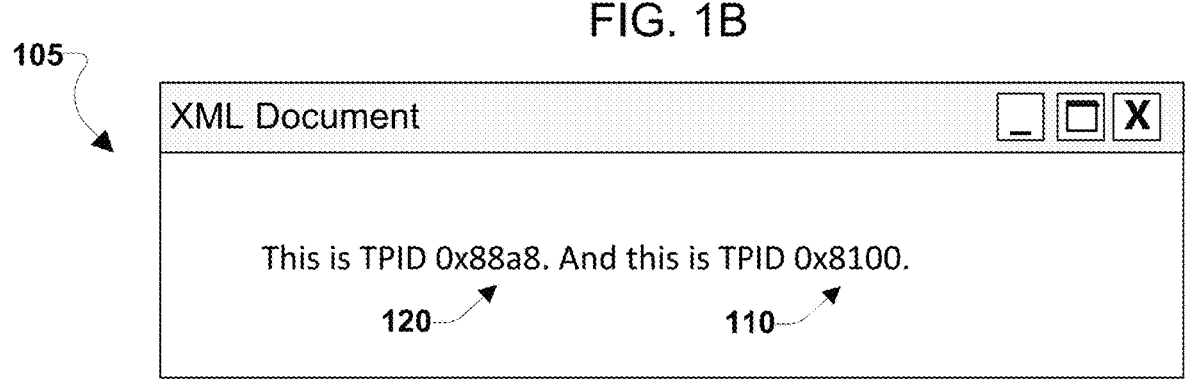
FIG. 1C is a graphic user interface illustrating the text editor and XML document from FIG. 1A that has been edited using a symmetric text replacement feature, in accordance with various embodiments.

FIGS. 1A-1C illustrate example graphic user interfaces from text editing software that may be configured to perform a symmetric text replacement, in accordance with various embodiments. The symmetric text replacement aspects of various embodiments may be useful to writers generally, and particularly programmers writing or editing code. In particular, a value-swap of a pair of separate and distinct text strings may be needed on various occasions. For example, a programmer editing an XML document 100, as illustrated in FIG. 1A, may realize that every current recitation of a first text string 110, illustrated as the code "0x8100," needs to be replaced with a second text string 120, illustrated as the code "0x88a8," and likewise every current recitation of the second text string 120 (i.e., 0x88a8) needs to be replaced with the first text string (i.e., 0x8100).

Using conventional text editing 'Find/Replace' type functionality, only one text swap can be done at a time. However, after the first text string is converted to the second text string, the replacement second text strings become indistinguishable from the original second text strings, making the second text swap ineffective.

In accordance with various embodiments, a symmetric text replacement feature of a text editor may be initiated in order to more easily and effectively perform a switch of two or more text strings. The two or more text strings will be distinct from one another in some way. For example, the actual text character or order of those text characters may be different between the two or more text strings. Alternatively, the two text strings may be the same or similar with regard to the text characters, but different in that the text strings may be found within the text file in association with different contextual parameters. Also, the two or more text strings may be found in a word processing document or other document containing text or a file with computer programming code, such as extensible markup language (XML), HTML, JSON, CSS, JavaScript, SQL, JAVA, C #, and the like, and may include any number of textual characters. In such an embodiment, a text string may be composed of a single character (e.g., the letter "a") or may be composed of almost any number of characters (e.g., hundreds or thousands of characters in a program/subroutine).

In addition, in accordance with various embodiments, the first and second text strings used in the symmetric text replacement feature may be recited anywhere within the text document relative to one another. In particular, the first and second text strings may be recited immediately adjacent one another, separated by a single character, word, or continuous text string or may be separated by any number of characters, words, or text strings. In such embodiments, the first and second text strings need not be located recited immediately adjacent one another in the text file.

FIG. 1B illustrates an exemplary user interface prompt, in the form of a pop-up window 130, that may be generated in response to the initiation of the symmetric text replacement feature. The user may initiate the symmetric text replacement feature by various means, such as using a drop-down menu, one or more key strokes, or other input method configured to launch the symmetric text replacement feature. Using the pop-up window 130, the user may enter a pair of text strings corresponding to the first text string 110 and the second text string 120, separated by a predetermined separation text character, such as a comma, colon, semi-colon, or the like. Also, the symmetric text replacement feature may recognize that an additional space after the separation text character may be ignored for the purpose of the symmetric text replacement. In FIG. 1B, a semi-colon followed by a space may be used as the predetermined separation text character(s). Thus, the user may enter the first and second text strings as a single combined text string containing both the first and second text strings separated by the predetermined separation text character(s). Alternatively, conjunction terms, such as "and" or "&" may be used. Additionally, special characters may be used when the need arises to replace the predetermined separation text character. For example, a semicolon (i.e., ";") is the predetermined separation character, in order to replace the separation character the user may include a supplemental separation character, such as a hash mark (i.e., "/"). Also, the user may be provided with two separate input windows, one for the first text string and the other for the second text string, which negates the need for the user to specifically enter a separation character.

Once the pair of text strings is inputted and the 'OK' or the 'Enter' key is executed, the symmetric text replacement feature may execute the symmetric text replacement. In particular, a processor executing the text editor or word processor application that includes the symmetric text replacement feature may scan the text document (e.g., XML Document 100) to locate at least one original recitation of either of the first or second text strings. Optionally, the text document scan performed by the processor may be directed to start at the beginning, middle, or end of the text document. Similarly, the text document scan may be selected to proceed in a forward (i.e., top/down) or backward (i.e., down/up) within the text document. Once a first recitation of either the first or second text strings is located, the processor may determine whether the located at least one original recitation of the first and second text strings matches the first text string or the second text string. Thus, the processor may replace the located at least one original recitation of the first and second text strings with a substituted recitations of the second text string in response to determining the located original recitation of the first and second text strings matches the first text string. Similarly, the processor may replace the located at least one original recitation of the first and second text strings with a substituted recitation of the first text string in response to determining the located original recitation of the first and second text strings matches the second text string. Before performing the actual replacement of the located at least one original recitation of the first and second text strings, the processor may once again seek confirmation by prompting the user for approval (i.e., "OK," "Skip," or "Cancel." Alternatively, the user may set an option for the feature to replace all recitations without the user being prompted after locating each individual text string.

FIG. 1C illustrates a result of the symmetric text replacement feature being executed on the XML Document 100 to generate a revised XML Document 105. In particular, the first text string 110 (i.e., "0x8100") has been replaced with the second text string 120 (i.e., "0x88a8,"). Likewise, the second text string 120 (i.e., "0x88a8") has been replaced with the first text string 110 (i.e., 0x8100).

Figure 2:
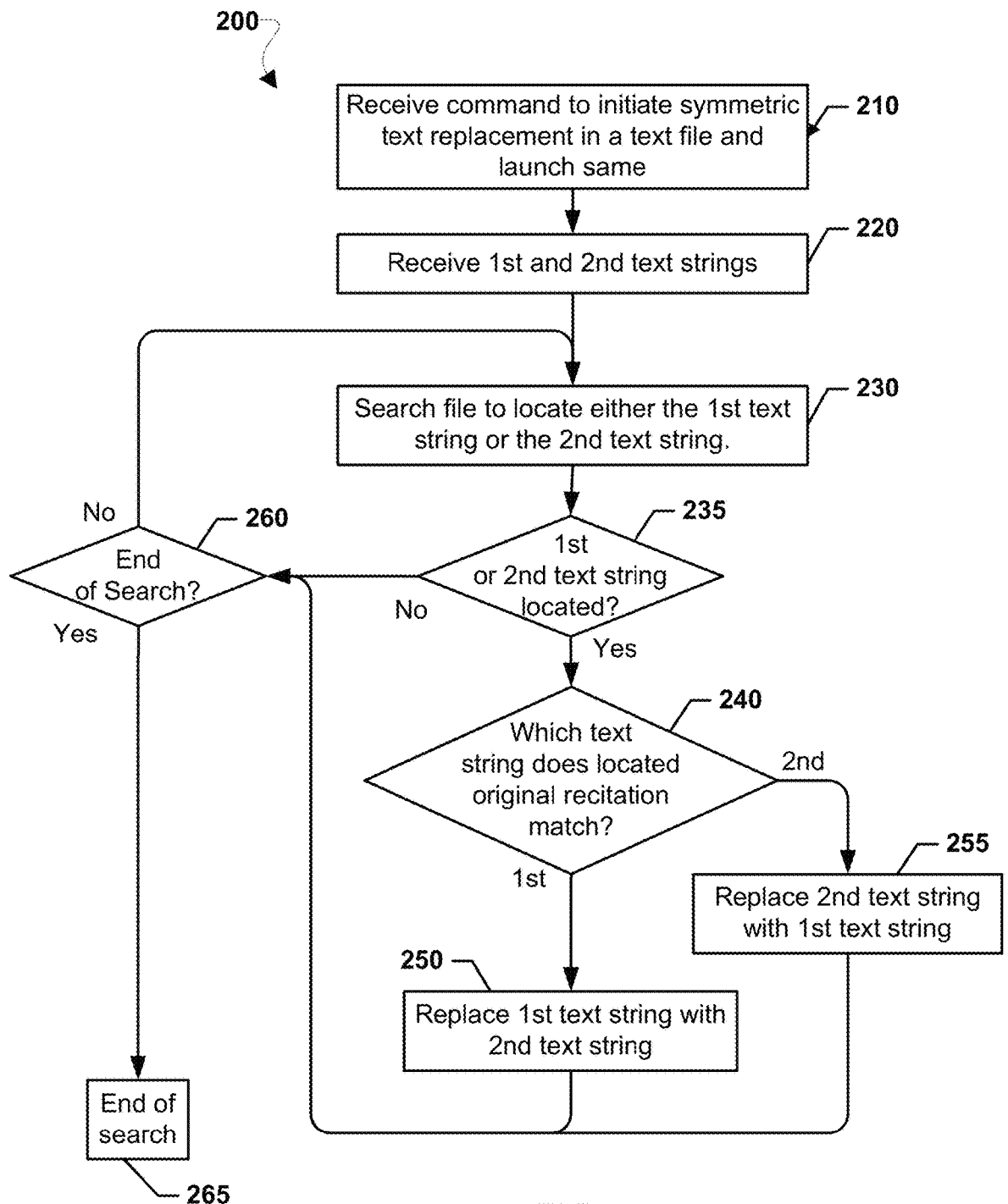
FIG. 2 is a process flow diagram illustrating an embodiment method for automatically editing a text document using symmetric text replacement, in accordance with various embodiments.

FIG. 2 is a process flow diagram illustrating an embodiment method 200 of automatically editing a text document using symmetric text replacement, in accordance with various embodiments. With reference to FIGS. 1-2, the operations of method 200 may be performed by a processor of a computing device (e.g., 800 in FIG. 8 or 900 in FIG. 9) running a text editor on one or more text document files.

In block 210 of the method 200, the processor may receive a command to initiate a symmetric text replacement in a text file (e.g., 100 in FIG. 1A), which may be any active text document or collection of text (i.e., the text file). Initiating the symmetric text replacement feature may effectively launch a program or subroutine configured to perform the symmetric text replacement feature. Launching the symmetric text replacement feature may in-turn initiate a prompt to the user for input. In particular, a pop-up window (e.g., 130 in FIG. 1B) or other user input means may become available for the user to enter at least a first and second text string that will be used for the symmetric text replacement. The user may be prompted to either enter each of the text strings (together or separately) or select (e.g., highlighting select text strings with a cursor) one or more sample text strings from the active text file. For example, the user may be provided instructions on how to enter more than one text string as a single combined text string containing both the first and second text strings separated by a punctuation mark or at least one other predetermined separation text character or set of characters. Alternatively, separate text fields may be provided for entering each of the first and second text strings respectively.

In block 220, the processor receives the first and second text strings input for performing a symmetric text replacement in the text file. The first and second text strings may be received from a user input, such as entered in response to a prompt presented to the user once the symmetric text replacement feature was activated. In accordance with various embodiments, the text editor may receive commands to initiate a symmetric text replacement from a user through a command-line user-interface (CLI), a graphic user interface (GUI), or other user interface (e.g., commands entered through speech recognition application).

In block 230, the processor performs a text search of the active text file to locate original recitations of the received first and second text strings. A search engine executed by the processor may examine all of the words in the text file, looking for matches to a search criteria set by the received first and second text strings. In this way, the text search may be configured to locate the next original recitation of text in the text file that matches either the first text string or the second text string. The text search may preliminarily include optical character recognition (OCR) for active text files containing text that is not in a machine-encoded text format.

In determination block 235, the processor may determine whether a recitation of the first or second text string is located. If a recitation of either the first text string or second text string is located (i.e., determination block 235="yes"), then the processor moves to determination block 240. If a recitation of either the first text string or the second text string is not located (i.e., determination block 235="no") then the processor moves to determination block 260 to determine whether to end the search or not.

In determination block 240, the processor determines which text string (first or second) the located original recitation of the first and second text strings matches (i.e., the first or second text strings). In response to determining the located original recitation of the first and second text strings matches the first text string (i.e., determination block 240="1st"), the processor may replace the located original recitation of the first text string with a substituted recitation of the second text string in block 250. In response to determining the located original recitation of the first and second text strings matches the second text string (i.e., determination block 240="2nd"), the processor may replace the located original recitation of the second text string with a substituted recitation of the first text string in block 255.

When replacing the located original recitation of text with the substituted recitation of corresponding text, in block 250 or block 255, the processor may also edit the meta-data of the text file to mark the location of the replacement or otherwise distinguish the substituted recitation of text from the original recitations of the same text. Marking the file location(s) or distinguishing the substituted text may help avoid subsequently replacing substituted recitations of text, which may revert them back to the original recitation of text. In other words, marking a start location in the file may prevent looping back around and replacing text strings that have already been replaced. Alternatively, during the search and replace function a location list may be maintained that identifies the location of each swap in order to prevent the swap of previously replaced text strings.

After performing the replace operations of either block 250 or block 255, the processor may determine, in determination block 260, whether to end the text search. In determination block 260, the processor may determine whether to end the search based on whether an end of the document has been reached. Alternatively, if the search was initiated from the end of the document and configured to search the text in a backward direction through the document, the processor in determination block 260 may determine whether the beginning of the document has been reached. As a further alternative, if the search was initiated from a middle location of the document (e.g., selected by the user, such as from a current position of an input cursor) and configured to scan forward or backward, the search may end when either the end or beginning of the document is reached, respectively, or may circle past the beginning or end until the location in which the search began was initiated. In response to determining to end the search (i.e., determination block 260="Yes"), the processor may end the search in block 265. In response to determining not to end the search (i.e., determination block 260="No"), the processor may return to block 230 to continue performing a text search of the active text file to locate a next original recitations of the received first and second text strings.

Figure 3:
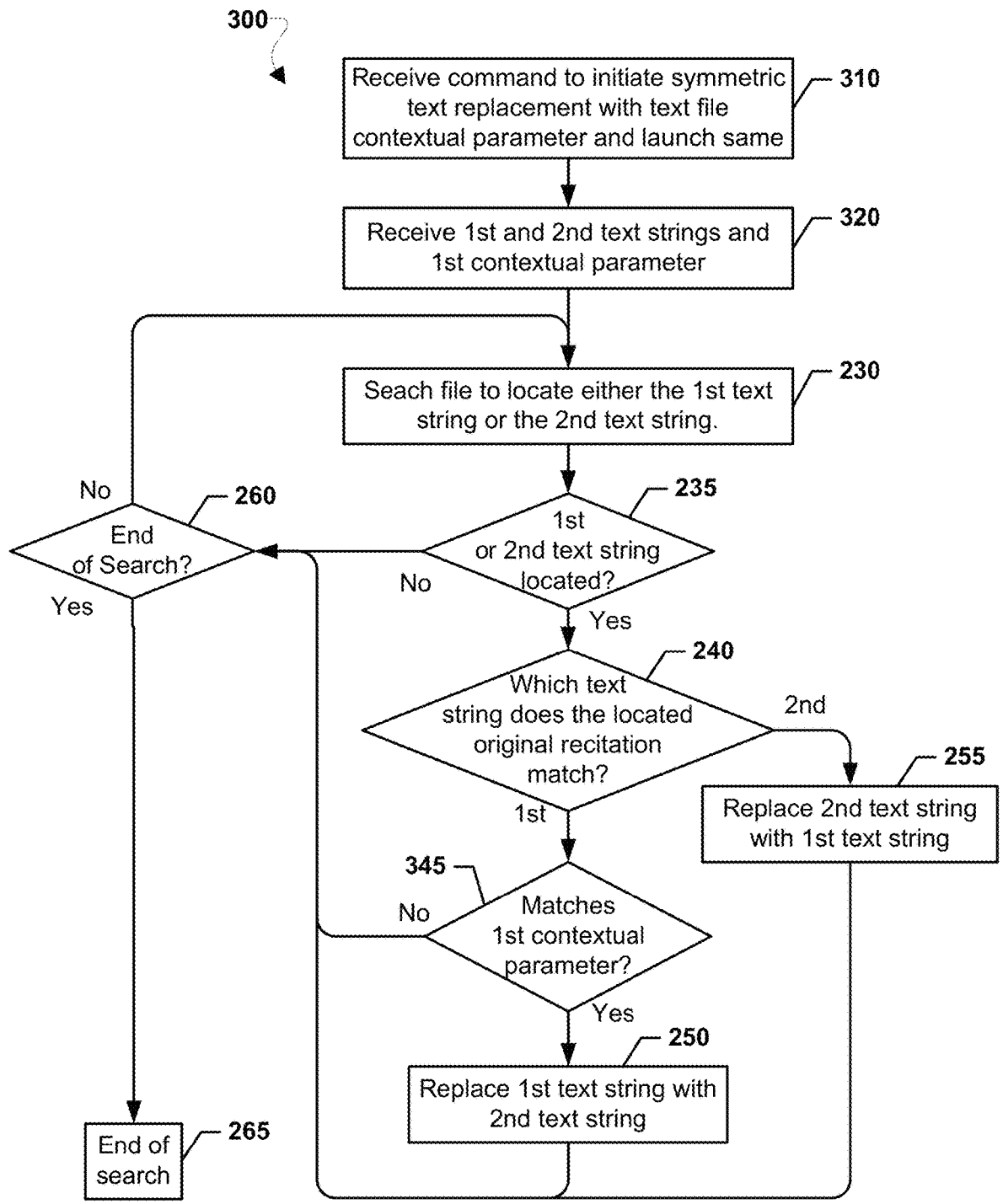
FIG. 3 is a process flow diagram illustrating an embodiment method for automatically editing a text document using symmetric text replacement with a contextual parameter, in accordance with various embodiments.

FIG. 3 is a process flow diagram illustrating an embodiment method 300 of automatically editing a text document using symmetric text replacement with a contextual parameter, in accordance with various embodiments. With reference to FIGS. 1-3, the operations of method 300 may be performed by a processor of a computing device (e.g., 800 in FIG. 8 or 900 in FIG. 9) running a text editor on one or more text files. In the method 300, the processor may perform operations of blocks 230, 250, 255, and 265, as well as determination blocks 235, 240, and 260 as described above with regard to the method 200.

In block 310 of the method 300, the processor may receive a command to initiate a symmetric text replacement in a text file (e.g., 100 in FIG. 1A), with the symmetric text replacement limited to recitations where the located text strings additionally match a contextual parameter. Initiating the symmetric text replacement with contextual parameters may effectively launch a program or subroutine configured to perform this type of symmetric text replacement, which may in-turn prompt the user for input about the first and second text strings, as well as the contextual parameter being considered. The user may be prompted to enter each of the first and second text strings, as described above. In addition, the user may be prompted to input a contextual parameter. The user may be provided instructions on how to enter the first and second text strings as well as the contextual parameter. Alternatively, the user may select from a list of contextual parameters.

A contextual parameter may be used by the processor to limit the text strings being replaced based on context rules in which the target text string(s) is/are found. The context may include the particular branch, root, or tree within a document/file in which the target text string is located. Alternatively, the context may include tags (e.g., HTML tags), or structural elements of a particular file, such as structural elements of how an HTML webpage is constructed. Structural element of a text file that are used as contextual parameters may include aspect related to where a text string is located within the file, such as a root or tree location in an XML or html file. For example, a located text string that matches a first text string may not be replaced with the provided second text string unless that first text string is also located on a particular branch of XML code, which branch was identified as a contextual parameter. HTML and word processing files similarly have structures that define underlying elements of the file, which may be used as contextual parameters. In a word processing document, formatting elements, such as the font, font size, font color, style, paragraph structure, etc. may be used as a contextual parameter used to limit the text replacement. In this way, although the searched-for text string may be located within the text file, if that located text string is not also associated with the provided contextual parameter then the located text string will not be replaced.

In block 320, the processor receives the first and second text strings input by the user, along with a first contextual parameter, for performing a conditional symmetric text replacement in the text file. The first and second text strings may be received from a user input, such as entered in response to a prompt presented to the user once the symmetric text replacement feature was activated. The contextual parameter may be included after the provided pair of text strings, separated by a similar separation text string or character. In some embodiment a text editor may display an XML-style tree structure for the user to select a node thereon as a contextual parameter. Alternatively, the XML tag name (for example, "<vid>") may be introduced as a contextual parameter. Also, other expressions may be used along with tag names, such as "<vid.{1,}>," for XML tags starting with vid and followed by at least one more character. A similar approach may be used for HTML and any tagged languages.

In determination block 235, the processor may determine whether a recitation of the first or second text string is located. If a recitation of either the first text string or second text string is located (i.e., determination block 235="yes"), then the processor moves to determination block 240. If a recitation of either the first text string or the second text string is not located (i.e., determination block 235="no") then the processor moves to determination block 260 to determine whether to end the search or not.

In determination block 240 of the method 300, in response to determining the located original recitation of the first and second text strings matches the first text string (i.e., determination block 240="1st"), the processor may further determine in determination block 345 whether the located original recitation of the first text string also matches the first contextual parameter.

In response to determining the located original recitation of the first text string matches the first contextual parameter (i.e., determination block 345="Yes"), the processor may replace the located original recitation of the first text string with a substituted recitation of the second text string in block 250. In response to determining the located original recitation of the first text string does not match the first contextual parameter (i.e., determination block 345="No"), the processor may determine, in determination block 260, whether to end the text search.

Figure 4:
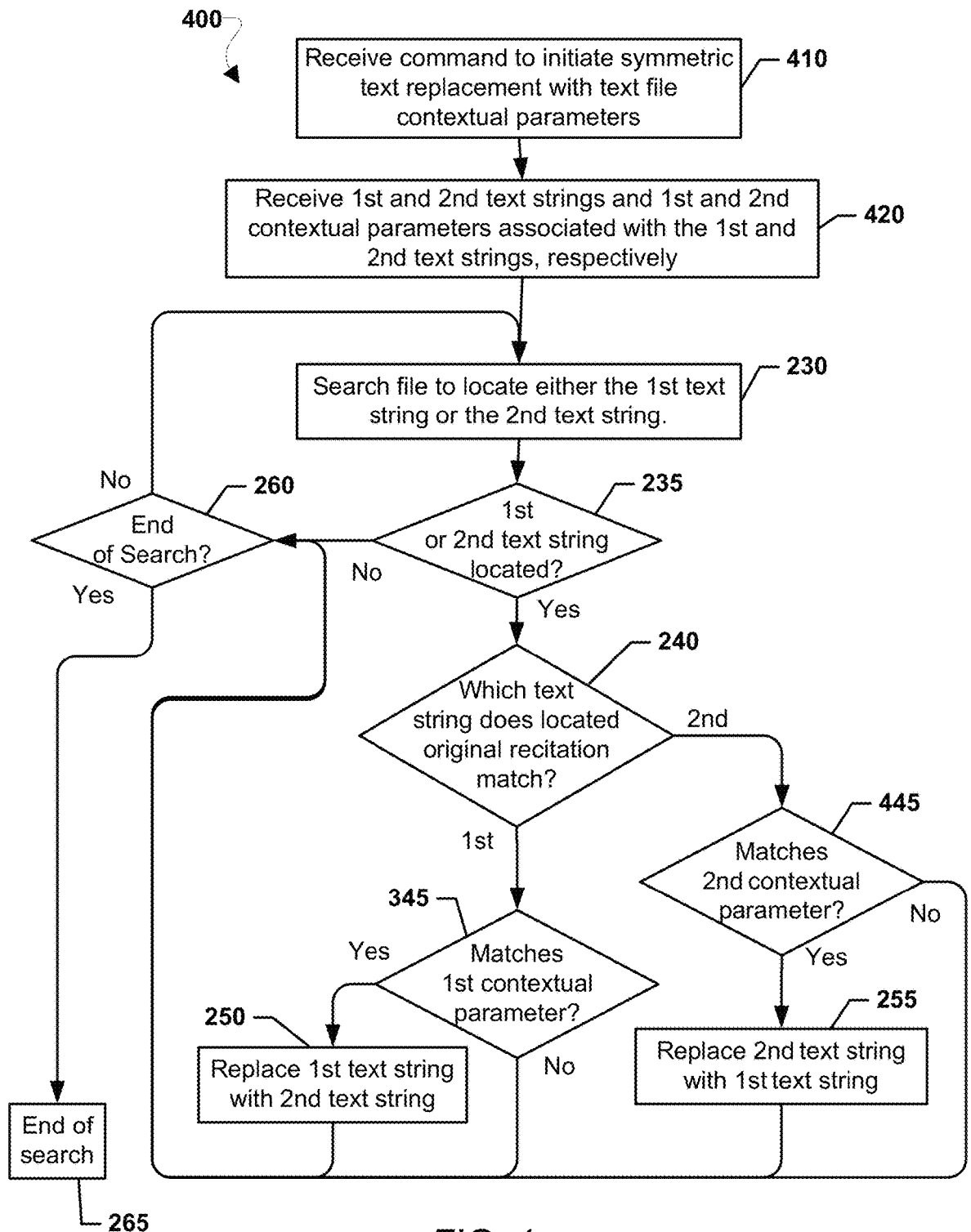
FIG. 4 is a process flow diagram illustrating an embodiment method for automatically editing a text document using symmetric text replacement with multiple contextual parameters, in accordance with various embodiments.

FIG. 4 is a process flow diagram illustrating an embodiment method 400 of automatically editing a text document using symmetric text replacement with multiple contextual parameters, in accordance with various embodiments. With reference to FIGS. 1-4, the operations of method 400 may be performed by a processor of a computing device (e.g., 800 in FIG. 8 or 900 in FIG. 9) running a text editor on one or more text files. In the method 400, the processor may perform operations of blocks 230, 250, 255, and 265, as well as determination blocks 235, 240, and 260 as described above with regard to the method 200 and operations of determination block 345 as described above with regard to the method 300.

In block 410 of the method 400, the processor may receive a command to initiate a symmetric text replacement in a text file (e.g., 100 in FIG. 1A), with the symmetric text replacement limited to recitations where the located text strings each additionally match a corresponding contextual parameter. Initiating the symmetric text replacement with multiple contextual parameters may effectively launch a program or subroutine configured to perform this type of symmetric text replacement, which may in-turn prompt the user for input about the first and second text strings, as well as the contextual parameters being considered. The user may be prompted to enter each of the text strings and the contextual parameters, as described above. The user may be provided instructions on how to enter the text strings as well as the contextual parameters. Alternatively, the user may select from a list of contextual parameters.

In block 420, the processor receives the first and second text strings input by the user, along with a first contextual parameter associated with the first text string and a second contextual parameter associated with the second text string, for performing a conditional symmetric text replacement in the text file. The first and second text strings may be received from a user input, such as entered in response to a prompt presented to the user once the symmetric text replacement feature was activated. The contextual parameters may be included after the provided pair of text strings, separated by a similar separation text string or character.

In determination block 235, the processor may determine whether a recitation of the first or second text string is located. If a recitation of either the first text string or second text string is located (i.e., determination block 235="yes"), then the processor moves to determination block 240. If a recitation of either the first text string or the second text string is not located (i.e., determination block 235="no") then the processor moves to determination block 260 to determine whether to end the search or not.

In determination block 240 of the method 400, in response to determining the located original recitation of the first and second text strings matches the first text string (i.e., determination block 240="1st"), the processor may further determine in determination block 345 whether the located original recitation of the first text string also matches the first contextual parameter.

In response to determining the located original recitation of the first text string matches the first contextual parameter (i.e., determination block 345="Yes"), the processor may replace the located original recitation of the first text string with a substituted recitation of the second text string in block 250. In response to determining the located original recitation of the first text string does not match the first contextual parameter (i.e., determination block 345="No"), the processor may determine, in determination block 260, whether to end the text search.

In determination block 240 of the method 400, in response to determining the located original recitation of the first and second text strings matches the second text string (i.e., determination block 240="2nd"), the processor may further determine in determination block 445 whether the located original recitation of the second text string also matches the second contextual parameter.

In response to determining the located original recitation of the second text string matches the second contextual parameter (i.e., determination block 445="Yes"), the processor may replace the located original recitation of the second text string with a substituted recitation of the first text string in block 255. In response to determining the located original recitation of the second text string does not match the second contextual parameter (i.e., determination block 445="No"), the processor may determine, in determination block 260, whether to end the text search.

The following exemplary algorithm, using C-like syntax, may be used to implement the method 400:

```
str1, str2 - string 1 and string 2 targets of symmetric text replacement
context_current - current contextual parameter in which text string is located
context_swap - context in which the swap is to be performed, when equal to
N/A, swap context is not defined
SOF = start of file
EOF = end of file
    1.  start, move to SOF
    2.  locate next element (e.g., word) and save to str_test, identify context
        and save into context_current
            a.  if str_test == str1 && (context_current == context_swap ||
                context_swap == N/A)
                then str_test = str2, save str_test
            b.  if str_test == str2 && (context_current == context_swap ||
                context_swap == N/A)
                then str_test = str1, save str_test
if EOF, exit; otherwise go back to 2
```

The above-noted example of the method 400 starts from the head of the file (i.e., Start of File—SOF) and moving to the End of File (EOF). Alternatively, various embodiments may proceed in a reverse direction, (EOF to SOF) or start at any location from SOF/EOF, using markers and any direction.

When only one swap condition (i.e., one contextual parameter) is defined, the above exemplary algorithm may operate to implement the method 300, as described above.

Figure 5:
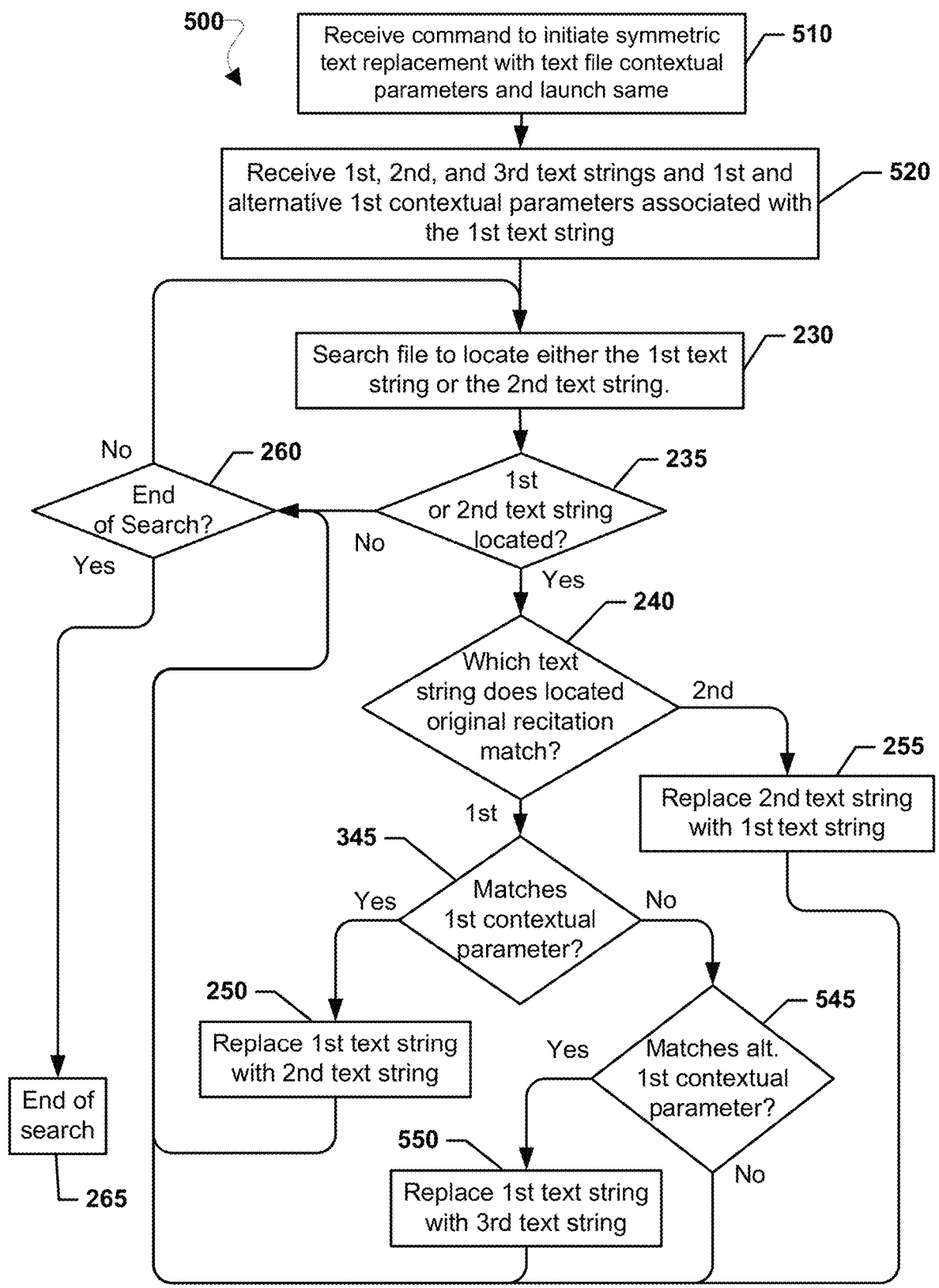
FIG. 5 is a process flow diagram illustrating an embodiment method for automatically editing a text document using symmetric text replacement with alternative contextual parameters for alternative text replacements, in accordance with various embodiments.

FIG. 5 is a process flow diagram illustrating an embodiment method 500 of automatically editing a text document using symmetric text replacement with alternative contextual parameters for alternative text replacements, in accordance with various embodiments. With reference to FIGS. 1-5, the operations of method 500 may be performed by a processor of a computing device (e.g., 800 in FIG. 8 or 900 in FIG. 9) running a text editor on one or more text files. In the method 500, the processor may perform operations of blocks 230, 250, 255, and 265, as well as determination blocks 235, 240, and 260 as described above with regard to the method 200 and operations of determination block 345 as described above with regard to the method 300.

In block 510 of the method 500, the processor may receive a command to initiate a symmetric text replacement in a text file (e.g., 100 in FIG. 1A), with alternative symmetric text replacements conditioned by alternative contextual parameters. Initiating the symmetric text replacement with alternative text replacements may effectively launch a program or subroutine configured to perform this type of symmetric text replacement, which may in-turn prompt the user for input about first, second, and third text strings, as well as two contextual parameters being considered. The user may be prompted to enter each of the text strings and the contextual parameters, as described above. The user may be provided instructions on how to enter the text strings as well as the contextual parameters. Alternatively, the user may select from a list of contextual parameters.

In block 520, the processor receives the first, second, and third text strings input by the user, along with a first contextual parameter associated with the first text string and an alternative first contextual parameter also associated with the first text string, for performing a conditional symmetric text replacement in the text file. The first, second, and third text strings may be received from a user input, such as entered in response to a prompt presented to the user once the symmetric text replacement feature was activated. The contextual parameters may be included following the respective second and third text strings to which they are associated.

Operation and determination blocks 230, 235, 240, 250, 255, 260, and 265 operate in the manner as discussed above with reference to FIGS. 2 and 3.

In determination block 345 of the method 500, in response to determining the located original recitation of the first text strings does not match the first contextual parameter (i.e., determination block 345="No"), the processor may further determine in determination block 545 whether the located original recitation of the first text string matches the alternative first contextual parameter.

In response to determining the located original recitation of the first text string matches the alternative first contextual parameter (i.e., determination block 545="Yes"), the processor may replace the located original recitation of the first text string with a substituted recitation of the third text string in block 550. In response to determining the located original recitation of the first text string does not match the alternative first contextual parameter (i.e., determination block 545="No"), the processor may determine, in determination block 260, whether to end the text search.

Figure 6:
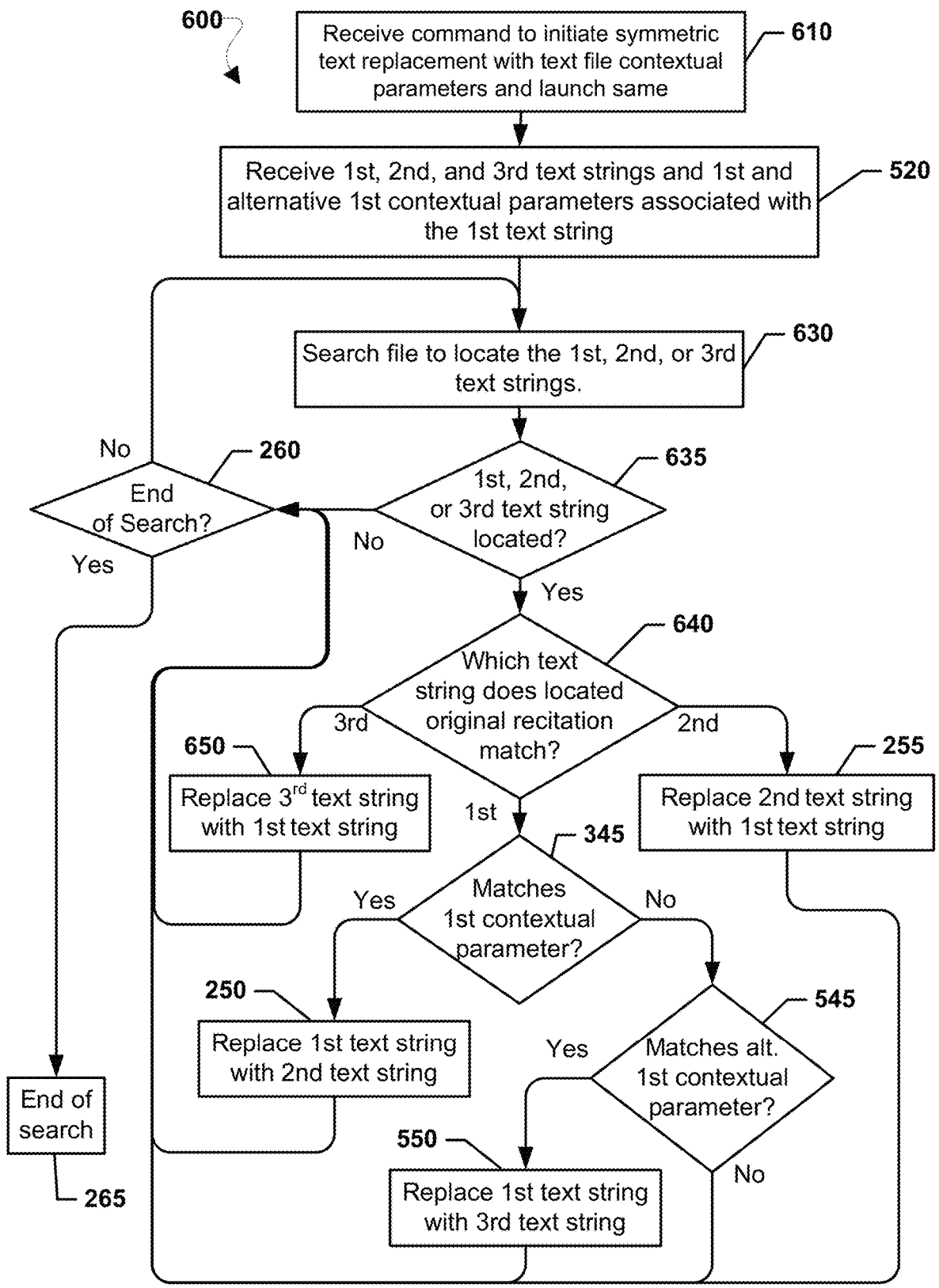
FIG. 6 is a process flow diagram illustrating an embodiment method for automatically editing a text document using symmetric text replacement with alternative text replacement, in accordance with various embodiments.

FIG. 6 is a process flow diagram illustrating an embodiment method 600 of automatically editing a text document using symmetric text replacement with alternative contextual parameters for more complex alternative text replacements, in accordance with various embodiments. With reference to FIGS. 1-6, the operations of method 600 may be performed by a processor of a computing device (e.g., 800 in FIG. 8 or 900 in FIG. 9) running a text editor on one or more text files. In the method 600, the processor may perform operations of blocks 250, 255, and 265, as well as determination block 260 as described above with regard to the method 200; operations of determination block 345 as described above with regard to the method 300; and operations of blocks 520 and 550, as well as determination block 545, as described above with regard to the method 500.

In block 610 of the method 600, the processor may receive a command to initiate a symmetric text replacement in a text file (e.g., 100 in FIG. 1A), with complex alternative symmetric text replacements conditioned by alternative contextual parameters. Initiating the symmetric text replacement with alternative text replacements may effectively launch a program or subroutine configured to perform this type of symmetric text replacement, which may in-turn prompt the user for input about first, second, and third text strings, as well as two contextual parameters being considered. The user may be prompted to enter each of the text strings and the contextual parameters, as described above. The user may be provided instructions on how to enter the text strings as well as the contextual parameters. Alternatively, the user may select from a list of contextual parameters.

In block 630, the processor performs a text search of the active text file to locate original recitations of the received first, second, and third text strings. A search engine executed by the processor may examine all of the words in the text file, looking for matches to a search criteria set by the received first, second, and third text strings. In this way, the text search is configured to locate the next original recitation of text in the text file that matches any one of the first text string, the second text string, or the third text string. The text search may preliminarily include optical character recognition (OCR) for active text files containing text that is not in a machine-encoded text format.

In determination block 635, the processor determines whether an original recitation of the first, second, and third text strings is located in the text file. In response to determining that an original recitation of the first, second, and third text strings is located in the text file (i.e., determination block 635="Yes"), the processor may determine, in determination block 640, which text string the located original recitation of the first, second, and third text strings matches. In response to determining that an original recitation of the first, second, and third text strings is not located or not yet located in the text file (i.e., determination block 635="No"), the processor may determine, in determination block 260, whether to end the text search.

In determination block 640, the processor determines which text string the located original recitation of the first, second, and third text strings matches (i.e., the first, second, or third text strings). In response to determining the located original recitation of the first, second, and third text strings matches the first text string (i.e., determination block 640="1st"), the processor may further determine in determination block 345 whether the located original recitation of the first text string also matches the first contextual parameter. In response to determining the located original recitation of the first, second, and third text strings matches the second text string (i.e., determination block 640="2nd"), the processor may replace the located original recitation of the second text string with a substituted recitation of the first text string in block 255. In response to determining the located original recitation of the first, second, and third text strings matches the third text string (i.e., determination block 640="3rd"), the processor may replace the located original recitation of the third text string with a substituted recitation of the first text string in block 650.

In response to determining the located original recitation of the first text string matches the alternative first contextual parameter (i.e., determination block 545="Yes"), the processor may replace the located original recitation of the first text string with a substituted recitation of the third text string in block 550. In response to determining the located original recitation of the first text string does not match the alternative first contextual parameter (i.e., determination block 545="No"), the processor may determine, in determination block 260, whether to end the text search. After performing the replace operation of block 650, the processor may determine, in determination block 260, whether to end the text search.

Figure 7:
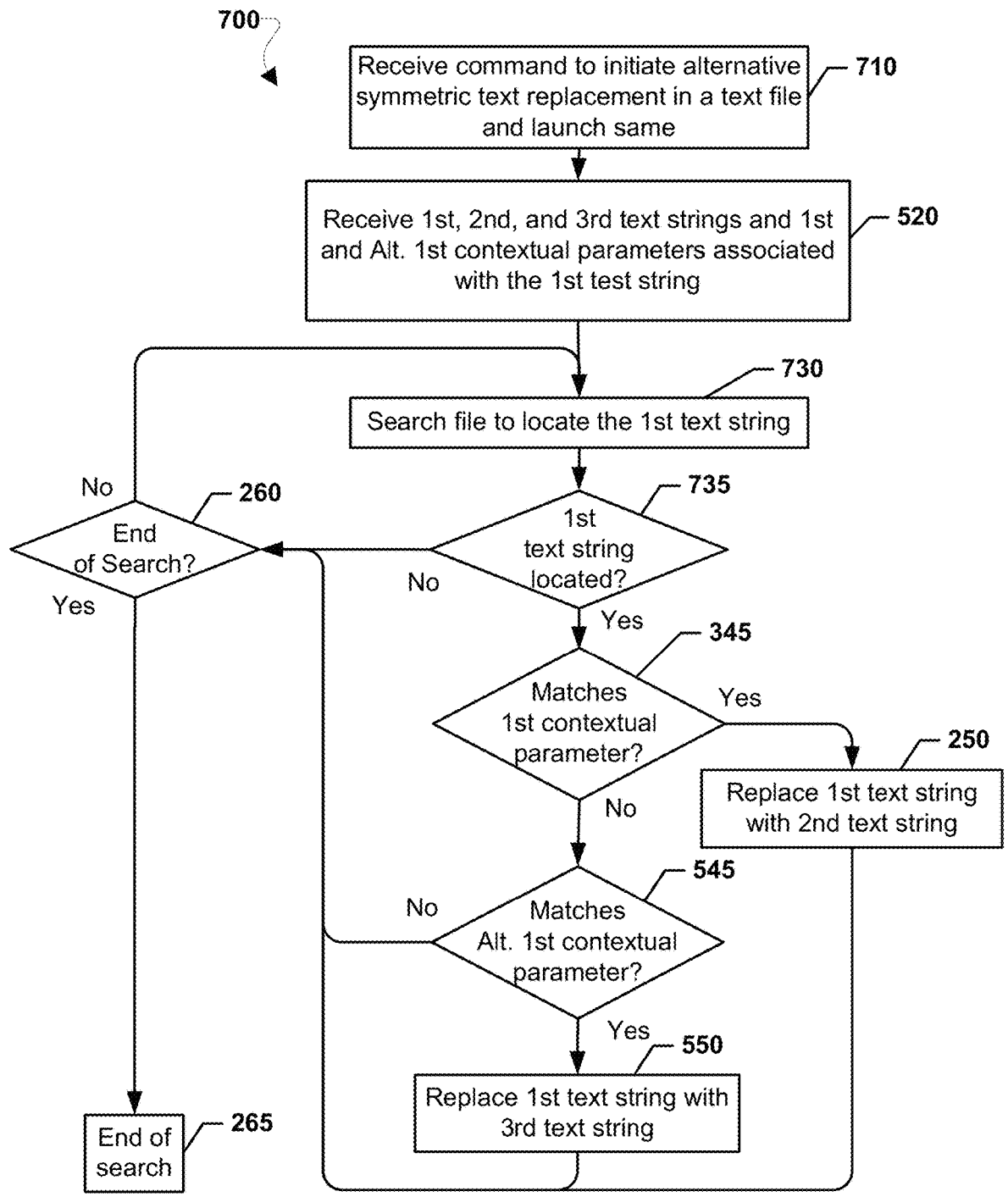
FIG. 7 is a process flow diagram illustrating an embodiment method for automatically editing a text document using symmetric text replacement with alternative text replacement, in accordance with various embodiments.

FIG. 7 is a process flow diagram illustrating an embodiment method 700 of automatically editing a text document using symmetric text replacement with alternative contextual parameters, in accordance with various embodiments. With reference to FIGS. 1-7, the operations of method 700 may be performed by a processor of a computing device (e.g., 800 in FIG. 8 or 900 in FIG. 9) running a text editor on one or more text files. The operations of the method 700 may be useful for alternative text replacement circumstances such as when a first text string should be replaced with a second text string when that first text string is located in one branch of computer coding, but should be replaced with a third text string when the that first text string is located in another branch of computer coding.

In the method 700, the processor may perform operations of blocks 250 and 265, as well as determination block 260 as described above with regard to the method 200; operations of determination block 345 as described above with regard to the method 300; and operations of blocks 520 and 550 and determination block 545 as described above with regard to the method 500.

In block 710 of the method 700, the processor may receive a command to initiate a symmetric text replacement in a text file (e.g., 100 in FIG. 1A), with a more straight forward alternative symmetric text replacement conditioned by alternative contextual parameters. Initiating the symmetric text replacement with alternative text replacements may effectively launch a program or subroutine configured to perform this type of symmetric text replacement, which may in-turn prompt the user for input about first, second, and third text strings, as well as two contextual parameters being considered. The user may be prompted to enter each of the text strings and the contextual parameters, as described above. The user may be provided instructions on how to enter the text strings as well as the contextual parameters. Alternatively, the user may select from a list of contextual parameters.

In block 730, the processor performs a text search of the active text file to locate original recitations of only the first text string. A search engine executed by the processor may examine all of the words in the text file, looking for matches to the received first text string. In contrast to the previous embodiment methods described above, the method 700 only search the text file for one text string and not the second or third provided text strings. As with the other methods described above, the text search may preliminarily include optical character recognition (OCR) for active text files containing text that is not in a machine-encoded text format.

In determination block 735, the processor determines whether an original recitation of the first text string is located in the text file. In response to determining that an original recitation of the first text string is located in the text file (i.e., determination block 735="Yes"), the processor may determine in determination block 345 whether the located original recitation of the first text string also matches the first contextual parameter. In response to determining that an original recitation of the first text string is not located or not yet located in the text file (i.e., determination block 735="No"), the processor may determine, in determination block 260, whether to end the text search.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 300, 400, 500, 600, and 700 may be substituted for or combined with one or more operations of the methods 200, 300, 400, 500, 600, and 700, and vice versa.

Figure 8:
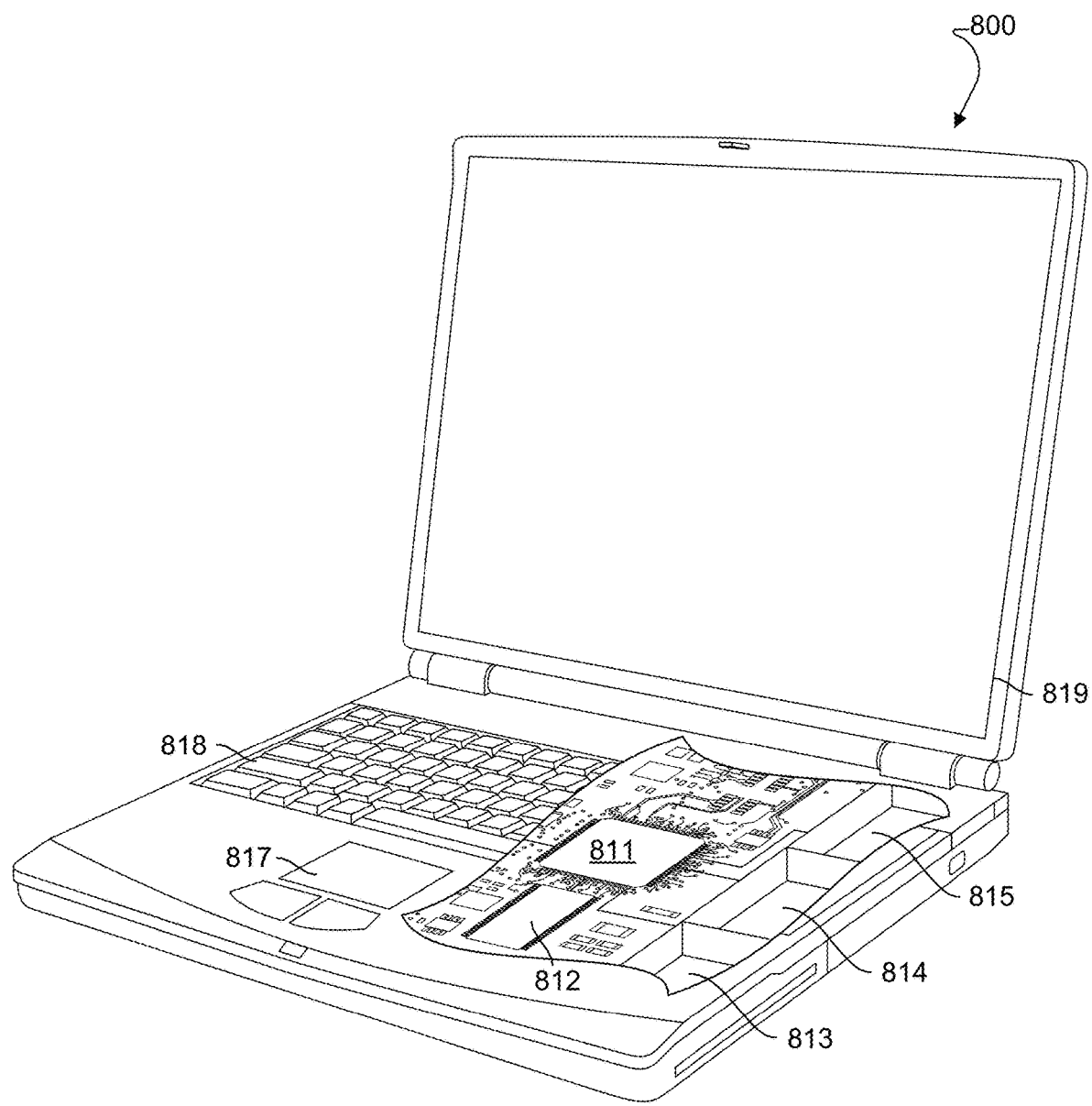
FIG. 8 is a component diagram of an example computing device suitable for use with various embodiments.

The various embodiments (including, but not limited to, embodiments discussed above with reference to FIGS. 1-7) described above may also be implemented within a variety of computing devices, such as a laptop computer 810 as illustrated in FIG. 8. Many laptop computers include a touch pad touch surface 817 and keyboard 818 that serve as input surfaces of the computing device, and thus may be used to register a telephone number in a number portability database as described above. A laptop computer 810 will typically include a processor 811 coupled to volatile memory 812 and a large capacity nonvolatile memory, such as a disk drive 813 of Flash memory. The laptop computer 810 may also include a floppy disc or other input drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits (e.g., interfaces) for coupling the processor 811 to a network. In a notebook configuration, the computer housing may include the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
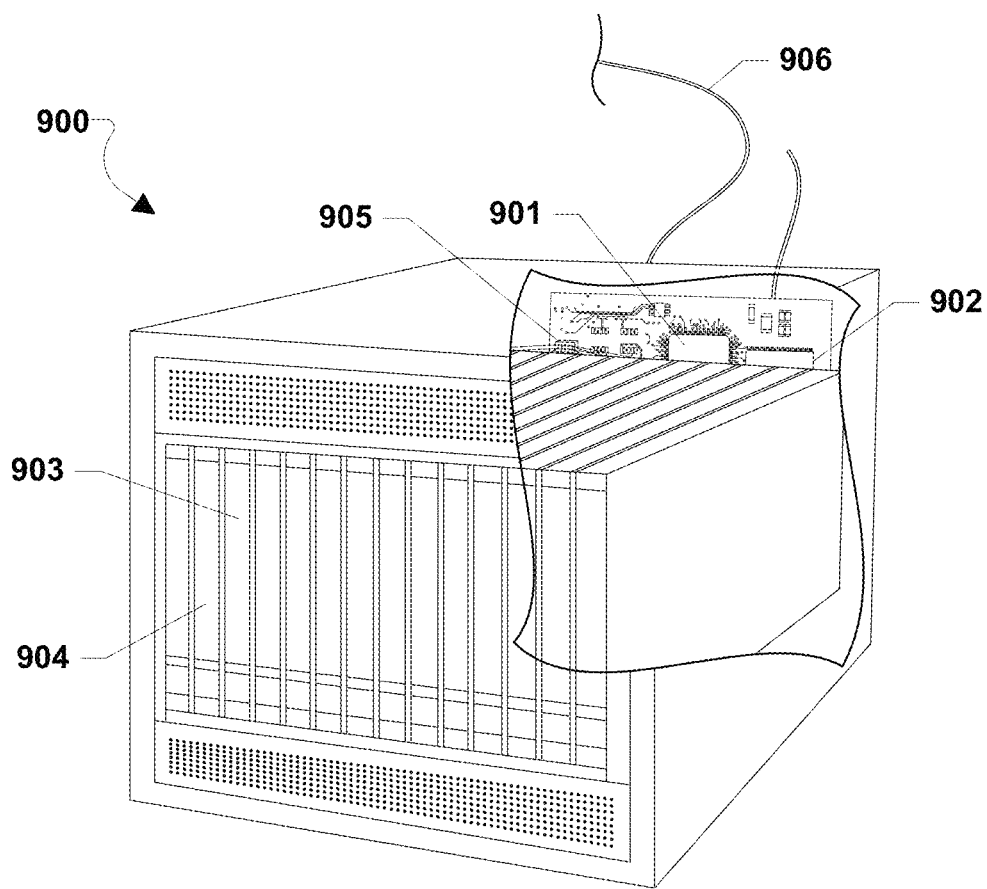
FIG. 9 is a component diagram of an example server suitable for use with the various embodiments.

Various embodiments (including, but not limited to, embodiments discussed above with reference to FIGS. 1-8) may be implemented on any of a variety of commercially available server devices, such as the server device 900 illustrated in FIG. 9. Such a server device 900 may include a processor 901 coupled to volatile memory 902 and a large capacity nonvolatile memory, such as a disk drive 903. The server device 900 may also include a floppy disc drive or other input drive, compact disc (CD) or DVD disc drive 904 coupled to the processor 901. The server device 900 may also include network access ports 905 coupled to the processor 901 for establishing data connections with a network connection circuit 906 and a communication network (e.g., IP network) coupled to other communication system network elements.

The processors 811, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 811, 901. The processors 811, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 811, 901 including internal memory or removable memory plugged into the device and memory within the processors 811, 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of automatically editing a text document, comprising:
   receiving, by a processor of a computing device, first and second text strings for performing a symmetric text replacement and swapping in a text file;
   locating, in the text file, at least one original recitation of either of the first and second text strings, wherein at least one intervening other text string is disposed between the first and second text strings;
   determining, by the processor, whether the located at least one original recitation of the first and second text strings matches the first text string or the second text string; and
   replacing, in the text file:
      each original recitation of the first text string with a substituted recitation of the second text string in response to determining the located original recitation of the first and second text strings matches the first text string, and
      each original recitation of the second text string with a substituted recitation of the first text string in response to determining the located original recitation of the first and second text strings matches the second text string, wherein a position of each of the at least one intervening other text strings disposed between the first and second text strings remains between the substituted recitation of the first and second text strings after replacing the at least one original recitation of the first and second text strings.

2. The method of claim 1, further comprising:
   receiving a first contextual parameter associated with the first text string, wherein replacing each original recitation of the first text string with the substituted recitation of the second text string is further in response to determining the located original recitation of the first and second text strings matches the first contextual parameter.

3. The method of claim 2, further comprising:
   receiving a second contextual parameter associated with the second text string, wherein replacing each original recitation of the second text string with the substituted recitation of the first text string is further in response to determining the located original recitation of the first and second text strings matches the second contextual parameter.

4. The method of claim 2, further comprising:
   receiving a third text string and an alternative first contextual parameter associated with the first text string for performing an alternate symmetric text replacement of the first text string with the third text string in the text file,
   determining whether the located at least one original recitation of the first and second text strings matches the first text string and the alternative first contextual parameter; and
   replacing each original recitation of the first text string with a substituted recitation of the third text string in response to determining the located original recitation of the first and second text strings matches the first text string and the alternative first contextual parameter.

5. The method of claim 4, further comprising:
   locating at least one original recitation of the third text string; and
   replacing each original recitation of the third text string with a substituted recitation of the first text string.

6. The method of claim 1, wherein the first and second text strings are received as a single combined text string containing both the first and second text strings separated by a punctuation mark.

7. The method of claim 1, wherein the first and second text strings are received as a single combined text string containing both the first and second text strings separated by at least one predetermined separation text character.

8. The method of claim 1, further comprising:
   receiving a general contextual parameter associated with either the first and second text strings, wherein replacing each original recitation of the first and second text strings is further in response to determining the located original recitations of the first and second text strings match the general contextual parameter.

9. The method of claim 1, wherein the at least one intervening other text string is not a conjunction term or expression.

10. A text editing device, comprising:
    a user interface; and
    a processor coupled to the user interface and configured to perform operations comprising:
       receiving via the user interface first and second text strings for performing a symmetric text replacement and swapping in a text file;
       locating, in the text file, at least one original recitation of either of the first and second text strings, wherein at least one intervening other text string is disposed between the first and second text strings;

determining whether the located at least one original recitation of the first and second text strings matches the first text string or the second text string; and replacing, in the text file:
each original recitation of the first text string with a substituted recitation of the second text string in response to determining the located original recitation of the first and second text strings matches the first text string, and each original recitation of the second text string with a substituted recitation of the first text string in response to determining the located original recitation of the first and second text strings matches the second text string wherein a position of each of the at least one intervening other text strings disposed between the first and second text strings remains between the substituted recitation of the first and second text strings after replacing the at least one original recitation of the first and second text strings.

11. The text editing device of claim 10, wherein the processor is configured with processor-executable instructions to perform operations further comprising:
receiving a first contextual parameter associated with the first text string, wherein replacing each original recitation of the first text string with the substituted recitation of the second text string is further in response to determining the located original recitation of the first and second text strings matches the first contextual parameter.

12. The text editing device of claim 11, wherein the processor is configured with processor-executable instructions to perform operations further comprising:
receiving a second contextual parameter associated with the second text string, wherein replacing each original recitation of the second text string with the substituted recitation of the first text string is further in response to determining the located original recitation of the first and second text strings matches the second contextual parameter.

13. The text editing device of claim 11, wherein the processor is configured with processor-executable instructions to perform operations further comprising:
receiving a third text string and an alternative first contextual parameter associated with the first text string for performing an alternate symmetric text replacement of the first text string with the third text string in the text file, determining whether the located at least one original recitation of the first and second text strings matches the first text string and the alternative first contextual parameter; and replacing each original recitation of the first text string with a substituted recitation of the third text string in response to determining the located original recitation of the first and second text strings matches the first text string and the alternative first contextual parameter.

14. The text editing device of claim 13, wherein the processor is configured with processor-executable instructions to perform operations further comprising:
locating at least one original recitation of the third text string; and replacing each original recitation of the third text string with a substituted recitation of the first text string.

15. The text editing device of claim 10, wherein the processor is configured with processor-executable instructions to perform operations such that the first and second text strings are received as a single combined text string containing both the first and second text strings separated by a punctuation mark.

16. The text editing device of claim 10, wherein the processor is configured with processor-executable instructions to perform operations such that the first and second text strings are received as a single combined text string containing both the first and second text strings separated by at least one predetermined separation text character.

17. The text editing device of claim 10, wherein the processor is configured with processor-executable instructions to perform operations further comprising:
receiving a general contextual parameter associated with either the first and second text strings, wherein replacing each original recitation of the first and second text strings is further in response to determining the located original recitations of the first and second text strings match the general contextual parameter.

18. The text editing device of claim 10, wherein the processor is configured with processor-executable instructions to perform operations such that the at least one intervening other text string is not a conjunction term or expression.

19. A non-transitory processor-readable storage medium having stored thereon processor-executable instructions configured to cause a processor of a text editing device to perform operations comprising:
receiving first and second text strings for performing a symmetric text replacement and swapping in a text file;

locating, in the text file, at least one original recitation of either of the first and second text strings, wherein at least one intervening other text string is disposed between the first and second text strings;

determining whether the located at least one original recitation of the first and second text strings matches the first text string or the second text string; and replacing, in the text file:
each original recitation of the first text string with a substituted recitation of the second text string in response to determining the located original recitation of the first and second text strings matches the first text string, and each original recitation of the second text string with a substituted recitation of the first text string in response to determining the located original recitation of the first and second text strings matches the second text string, wherein a position of each of the at least one intervening other text strings disposed between the first and second text strings remains between the substituted recitation of the first and second text strings after replacing the at least one original recitation of the first and second text strings.

20. The non-transitory processor-readable storage medium of claim 19, wherein the stored processor-executable instructions are configured to cause the processor of the text editing device to perform operations further comprising:
receiving a first contextual parameter associated with the first text string, wherein replacing each original recitation of the first text string with the substituted recitation of the second text string is further in response to determining the located original recitation of the first and second text strings matches the first contextual parameter.

21. The non-transitory processor-readable storage medium of claim 20, wherein the stored processor-executable instructions are configured to cause the processor of the text editing device to perform operations further comprising:
receiving a second contextual parameter associated with the second text string, wherein replacing each original recitation of the second text string with the substituted recitation of the first text string is further in response to determining the located original recitation of the first and second text strings matches the second contextual parameter.

22. The non-transitory processor-readable storage medium of claim 20, wherein the stored processor-executable instructions are configured to cause the processor of the text editing device to perform operations further comprising:
receiving a third text string and an alternative first contextual parameter associated with the first text string for performing an alternate symmetric text replacement of the first text string with the third text string in the text file,
determining whether the located at least one original recitation of the first and second text strings matches the first text string and the alternative first contextual parameter; and
replacing each original recitation of the first text string with a substituted recitation of the third text string in response to determining the located original recitation of the first and second text strings matches the first text string and the alternative first contextual parameter.

23. The non-transitory processor-readable storage medium of claim 22, wherein the stored processor-executable instructions are configured to cause the processor of the text editing device to perform operations further comprising:
locating at least one original recitation of the third text string; and
replacing each original recitation of the third text string with a substituted recitation of the first text string.

24. The non-transitory processor-readable storage medium of claim 19, wherein the stored processor-executable instructions are configured to cause the processor of the text editing device to perform operations such that the first and second text strings are received as a single combined text string containing both the first and second text strings separated by a punctuation mark.

25. The non-transitory processor-readable storage medium of claim 19, wherein the stored processor-executable instructions are configured to cause the processor of the text editing device to perform operations such that the first and second text strings are received as a single combined text string containing both the first and second text strings separated by at least one predetermined separation text character.

26. The non-transitory processor-readable storage medium of claim 19, wherein the stored processor-executable instructions are configured to cause the processor of the text editing device to perform operations further comprising:
receiving a general contextual parameter associated with either the first and second text strings, wherein replacing each original recitation of the first and second text strings is further in response to determining the located original recitations of the first and second text strings match the general contextual parameter.

27. The non-transitory processor-readable storage medium of claim 19, wherein the stored processor-executable instructions are configured to cause the processor of the text editing device to perform operations such that the at least one intervening other text string is not a conjunction term or expression.

* * * * *